United States Patent [19]
McDavid et al.

[11] 3,754,884
[45] Aug. 28, 1973

[54] GLASS CUTTING METHOD AND APPARATUS

[75] Inventors: James C. McDavid; Russell H. Miles, Jr., both of Kingsport, Tenn.

[73] Assignee: ASG Industries, Inc., Kingsport, Tenn.

[22] Filed: July 15, 1971

[21] Appl. No.: 162,968

Related U.S. Application Data

[63] Continuation-in-part of Ser. No. 771,385, Oct. 29, 1968, abandoned.

[52] U.S. Cl. .......... 65/97, 65/174, 225/96.5
[51] Int. Cl. .......... C03b 21/00
[58] Field of Search .......... 65/84, 70, 97, 174, 65/175, 176; 225/96.5

[56] References Cited
UNITED STATES PATENTS

| | | | |
|---|---|---|---|
| 2,243,149 | 5/1941 | Despret | 65/84 |
| 1,560,077 | 11/1925 | Gelstharp | 65/175 |
| 3,141,589 | 7/1964 | Jochim | 225/96.5 X |

*Primary Examiner*—Arthur D. Kellogg
*Attorney*—Dean S. Edmonds, Harry C. Jones III et al.

[57] ABSTRACT

A method and apparatus for cutting glass sheets from a glass ribbon in the continuous production of glass. The glass ribbon, after it is formed from molten glass material, is brought to a temperature corresponding to the strain point of the glass and cut while at this temperature into successive sheets.

16 Claims, 4 Drawing Figures

PATENTED AUG 28 1973 3,754,884
SHEET 1 OF 2

INVENTORS
James C. McDavid
Russell H. Miles, Jr.

BY Pennie, Edmonds
Morton, Taylor & Adams
ATTORNEYS

PATENTED AUG 28 1973 3,754,884

INVENTORS
James C. McDavid
Russell H. Miles, Jr.

BY
ATTORNEYS

GLASS CUTTING METHOD AND APPARATUS

RELATED APPLICATION

This application is a continuation-in-part of applicants' copending application Ser. No. 771,385 filed Oct. 29, 1968 now abandoned and entitled Continuous Tempering System.

BACKGROUND OF THE INVENTION

The cutting of glass sheets from a continuous ribbon of glass may be effected either before or after the glass is cooled from the elevated temperatures of which it is formed. In either case, the cutting requires specialized procedures. One of the problems involved is that glass upon cooling takes on a strain. The strain is caused by temperature variations occurring in the glass during the cooling process. More particularly as glass cools, its outer surface beomese hard while the center of the mass is still soft or even in a plastic, flowable state. Upon cooling, the glass beings to shrink, Since, however, the surface has already hardened, it cannot move and so the glass is progressively placed under increasing compression. This in turn sets up the strain patterns in the glass. Upon cutting such glass, the strain pattern causes deviation from the cutting line which in turn can cause chips and flares to occur on the edge of the glass. This results in poor appearing and generally unsatisfactory cut-edge. The higher the strain in the glass, the more difficult it is to produce an acceptable cut.

To avoid the problems of strain, procedures have been used whereby the glass ribbon as formed from molten glass material is cooled very slowly. This cooling is controlled as much as possible to maintain the temperature of the glass substantially uniform throughout its thickness during the entire cooling process. Glass cooled in this manner is called annealed glass and has a relatively low strain. This type of glass will cut well when cold.

Where it is desired to form tempered glass, the problems relating to strain are again encountered. Fully tempered glass has a very high strain and is simply not cuttable in this condition. Similarly, poor annealed glass will have a strain interfering with proper cutting.

Where tempered glass is desired, the general practice has been to first produce annealed glass, cut this into sheets and then subsequently reheat the sheets to a temperature suitable for tempering. This procedure is both time consuming and expensive. After the cutting of the annealed glass, it is common practice to store the sheets until a complete run has been made. The sheets must then be removed from storage and the tempering apparatus placed in operation. Because of manpower and/or space limitations, it is generally not feasible to run the tempering apparatus at the same time as the glass forming and cutting apparatus is in operation.

In the continuous production of hardened glass, the prior art does disclose procedures whereby the glass can be cut into sheets as an integral step of the production operation. More particularly, U.S. Pat. No. 2,243,149 discloses a method and apparatus for making hardened glass wherein a ribbon of glass is formed from molten material and fed through a cooling apparatus to effect hardening with the ribbon being cut into sheets either before or after passing through the cooling apparatus. The practicality of cutting after hardening is of dubious value in view of the strain which had been produced in the glass. This patent disclosed, however, a procedure whereby the glass in being cut is heated electrically or by blowpipe to raise its temperature to the melting point of the glass. Alternatively, this patent discloses that where cutting is effected before hardening, a rotating or drop type of knife may be used.

With the cutting procedure disclosed in the above-mentioned patent, cutting before hardening by means of a rotating or drop knife will produce an unacceptable cut edge. The cut will not be clean and square and in a plane at 90° realtive to the surface of the glass. Nor will it be free of flares and chips. Instead the cutting as disclosed in this patent will leave a mashed or pinched edge which will more than likely contain chips tending to cause breakage of the glass is use.

SUMMARY OF THE INVENTION

In accordance with the teachings of the present invention an improved cutting procedure is provided for cutting glass into sheets as an integral step of forming tempered glass. The improved cutting procedure involves adjusting the temperature of the glass ribbon immediately after it is formed to about the strain point of the glass. The temperature of the glass will also be adjusted so that it is uniform throughout its thickness and width. At this temperature the glass will contain little or no strain.

With the glass in this condition, a scoreline is scribed across the width of the ribbon at the point where each successive sheet is to be cut. After scoring, the leading end of the ribbon is snapped off from the remaining portion of the ribbon. Alternatively, a cold jet of fluid is applied to the scoreline quickly after it has been formed and while the temperature of the glass is still at the strain point.

The cut edge which is formed in accordance with the cutting procedure of the present invention will be a clean square cut progressing through the glass at 90° to its surface. The edge will also be free of flares and chips and will generally be comparable to a normal trade cut edge.

With applicant's cutting procedure, the residual heat of the molten glass material from which the ribbon is formed is used in bringing the temperature of the glass to that required for cutting. Immediately after the cutting, the temperature of the glass need only be adjusted a small amount to prepare the sheets for tempering. The employment of the in-line cutting procedure of the present invention as part of the overall procedure for producing tempered glass is disclosed in applicant's above-mentioned copending application.

DESCRIPTION OF THE PREFERRED EMBODIMENTS

Figure 1:
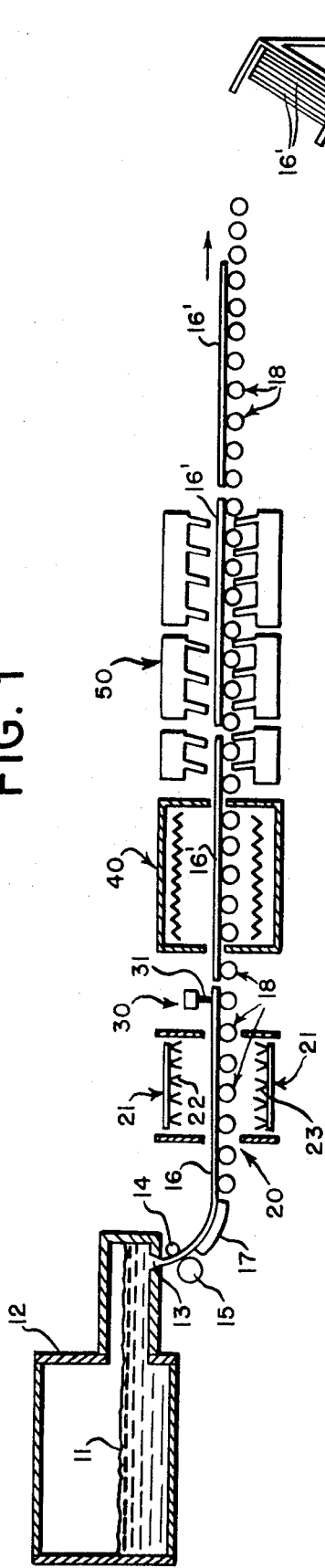
FIG. 1 is a schematic view of the apparatus used in the continuous production of tempered glass sheets showing the incorporation of the cutting apparatus of the present invention.
Figure 3:
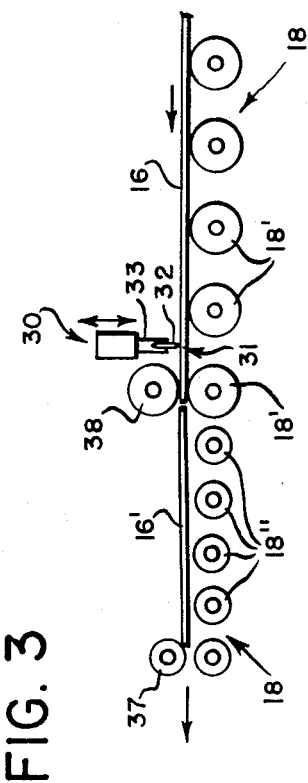
FIG. 3 is a side view taken along lines 3—3 of FIG. 2 showing the snapping of a sheet from the ribbon of glass.

The cutting apparatus of the present invention is adapted to be incorporated into the continuous system for producing tempered glass. Referring to FIG. 1, molten glass 11 contained in a supply vessel 12 is drawn through the orifice 13 in the lower side of the vessel and pressed out between forming rollers 14 and 15 into a ribbon of glass 16 having the width desired in the finished product. The ribbon, still in a rather plastic state, passes along a curved guide 17 and allowed to cool in the ambient atmosphere. After having cooled enough to be somewhat self-supporting, the ribbon is fed onto a variable speed conveyor 18 which carries it through the subsequent processing stations of the system. As shown in the drawing, these stations, in order of their encounter by the glass, include a preliminary heating station 20, a cutting station 30, a reheating station 40, and a quenching station 50.

The glass after being formed into the ribbon 16 is at a temperature of about 900°C but is constantly cooling as it enters upon the conveyor and begins its travel toward the cutting station at which point the ribbon is cut into individual sheets. The cutting of the ribbon is advantageously performed at a temperature between 400°C and 550°C as determined by a conventional radiation pyrometer. To assure that the glass arrives at the cutting station within this temperature range, a heating means 21, comprising upper and lower heating elements 22 and 23, is provided at the heating station 20.

Upon emerging from the heating station 20, the glass ribbon passes immediately to the cutting station 30 where it is first scored transversely and then cut by the mechanism 31 into successive sheets 16'. Both the scoring and cutting operations are effected while the ribbon continues its movement along the conveyor 18. By cutting the ribbon at an elevated temperature as opposed to room temperature, cutting checks which may occur heal rapidly. In addition, the cutting at the elevated temperature provided by the residual heat of the molten glass is an important aspect of the tempering operation in that it eliminates the great heating requirements of conventional tempering operations and provides a continuous process for forming tempered glass as the end product of the conventional glass forming operation.

After the cutting of the ribbon into successive sheets, such sheets are prepared for quenching by passing them through the reheating station 40 where this temperature is brought up to one suitable for tempering. A tempering temperature of between about 550°C and 675°C is advantageously used, with the particular temperature being determined by the type of glass processed and by its chemical properties. Generally, the temperature of the glass sheets must be raised to a point where the glass begins to soften or deform.

As stated above the cutting of the ribbon is performed at a temperature between 400° and 550°C. The exact temperature used will depend on the particular composition of the glass being cut. In accordance with the teachings of the present invention, the temperatures within the mentioned range include those corresponding to the strain point of different glass compositions. During the cutting operation the strain in the glass ribbon should, as far as practical, be at a minimum.

As the temperature falls below the strain point, the strain in the glass will increase, and depending on the composition of the glass, this can result in poor cutting and sometimes failure of the break to follow a straight line. At temperatures above the strain point the glass begins to flow plasticly and is no longer self-sustaining. The temperature to which the ribbon is adjusted immediately prior to cutting is therefore one which is just below the temperature at which the glass is self-sustaining and susceptible to being cut according to the cutting procedure of the present invention.

Cutting at the strain point of the glass is most advantageous in that the glass is both essentially void of strain and in a self-sustaining condition. Temperatures below and above the strain point of the glass are, however, acceptable. Again the particular temperature chosen depends on the glass composition of the ribbon and the quality of the cut edge required.

Whatever temperature is chosen within the above operating range, the heating means 21 at the heating station 20 is used to adjust the temperature of the glass ribbon so that it is uniform throughout both its thickness and width. Immediately after the glass ribbon leaves the heating station 20 it is fed through the cutting station 30. As the ribbon is fed through this station, a scoring and cutting mechanism 31 breaks the ribbon into successive sheets.

Figure 2:
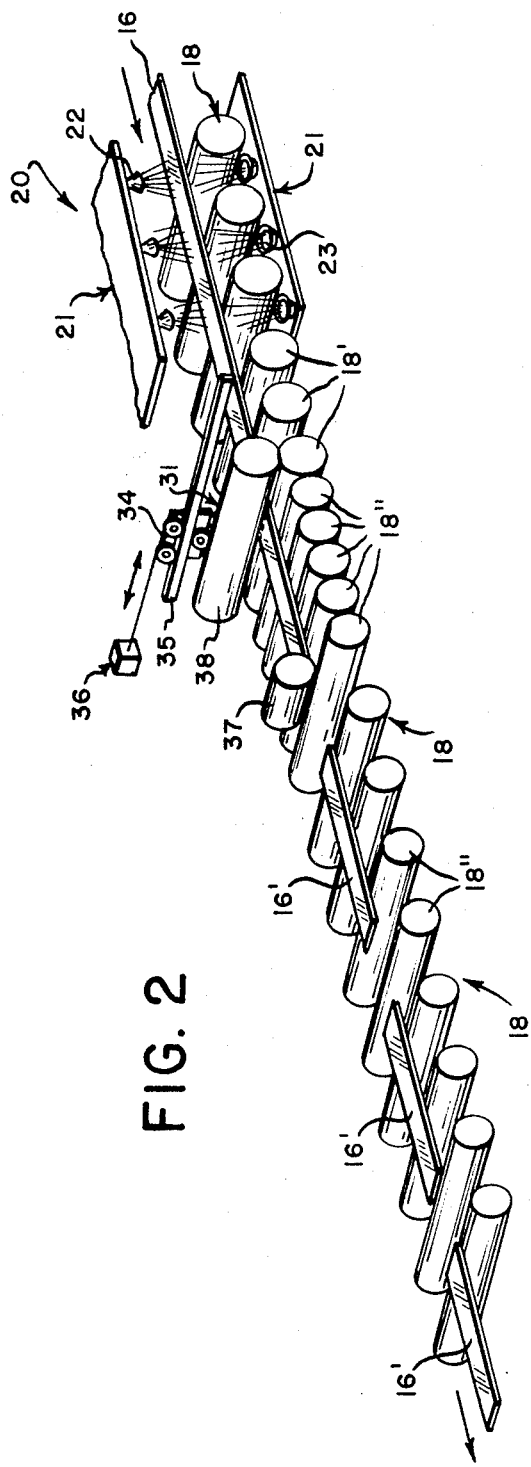
FIG. 2 is a schematic view of the cutting apparatus of the present invention.

As shown in FIG. 2, the cutting mechanism includes a cutting wheel 32 mounted on the end of an air cylinder 33. The air cylinder is, in turn, carried by a trolley support 34 secured to a track 35 extending diagionally across the path of movement of the underlying glass ribbon. A suitable drive mechanism 36 is provided for moving the cutting wheel across the ribbon while in engagement with its upper surface. The air cylinder is adjusted to press the cutting wheel against the surface of the glass to effect scoring of this surface. The scoring of the glass forms an incipient crack in the top surface which weakens the ribbon along the direction of the scoreline. The cutting wheel is reciprocated back and forth across the ribbon at timed intervals to form successive scorelines at the points where the ribbon is to be broken into sheets. The diagonal orientation of the track 35 permits the scoring to be effected on the ribbon as the latter moves in a direction of its length. Of course the cutting wheel will be raised during each return movement thereof.

As shown in FIG. 2, the conveyor 18 used for supporting and feeding the glass ribbon and sheets is constructed with rollers of different size. More particularly, the rollers 18' which underlie the ribbon are of one diameter up to the point immediately behind the location of the scoring mechanism. Forward of this location rollers 18'' are of a smaller diameter. The centers of rotation of all of the rollers lie within the same plane. With this construction, the rollers 18' and 18'' divide the conveyor into first and second conveyor sections. The first section underlies the ribbon while the second section underlies the sheets after they are cut from the ribbon.

The plane in which the upper surface of the first conveyor sections lies is higher than the plane in which the upper surface of the second conveyor section lies. Accordingly, as the glass ribbon moves from the first section to the second section and prior to being cut, it is unsupported. The ribbon continues its movement in this manner until its leading end moves into contact with a guide roller 37. This guide roller is positioned over the second conveyor section with its axis of rotation above the plane in which the unsupported ribbon lies. Thus, upon contact of the leading end of the ribbon, it urges the ribbon downwardly into the plane defined by the upper surface of the second conveyor section.

The guide roller 37 is spaced from the end of the first conveyor section so that engagement with the leading end of the ribbon occurs just as the scoreline is moving off the last roller 18'. Immediately above this last roller is another roller 38 which engages against the upper surface of the glass ribbon and holds it in the first mentioned plane as the leading end of the ribbon is engaged by the guide roller 37. The portion of the ribbon forwardly of the scoreline will, upon engagement with the guide roller 37, be forced downwardly and this will, in turn, produce a distoring force causing the glass to snap at the scoreline and break away from the remaining portion of the ribbon on the other side of the scoreline.

After the glass sheet has been cut from the ribbon, the rollers 18'' will feed it into the heating station 40 preparatory to the quenching operation needed for tempering. Suitable drive means is provided for power driving the rollers of the two conveyor sections. Advantageously, rollers 18'' are driven at a higher speed than rollers 18' so as to separate the sheets from each other.

Figure 4:
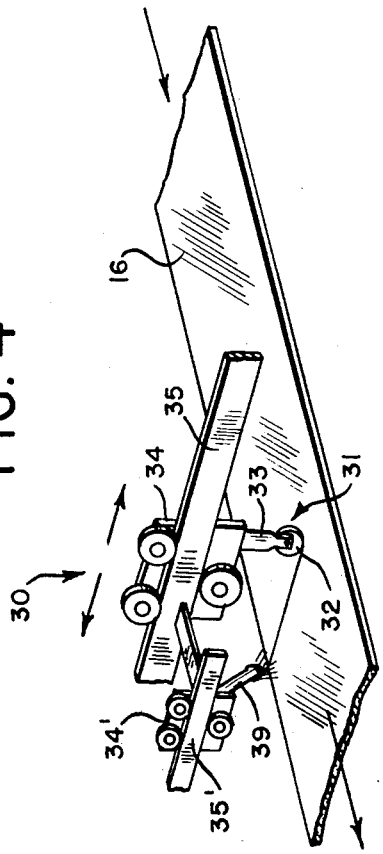
FIG. 4 is a schematic view of an alternative embodiment of the cutting appatatus of the present invention.

As an alternative to the mechanical scoring and breaking of the glass ribbon into sheets, the cutting may be effected by propagating a cut along the scoreline by the application of a jet of cold water or air. The mechanism for cutting of this manner is shown in FIG. 4. The preliminary scoring of the glass sheet is done in the same way as with the apparatus shown in FIG. 2; and attached to the trolley support 34 is a secondary trolley support 34' riding on its own track 35'. This trolley support carries a nozzle 39 depending downwardly therefrom and through which a jet of air or water spray is played along the previously formed scoreline. The positioning of the secondary support 34' and nozzle 39 downstream of the scoring mechanism and it is attached to the same drive mechanism 36 for moving the scoring mechanism across the glass ribbon. With this construction, the jet of air or water will be directed progressively across the scoreline quite quickly after the scoreline has been formed and while the temperature of the ribbon is still at about the strain point. The sudden cooling along this scoreline causes the glass to break at this point. The cut sheets them drop onto the second conveyor section comprised of the rollers 18'' for feeding through the remaining production stations.

We claim:

1. In the continuous production of glass sheets wherein a glass ribbon is formed from molten glass material, the improvement in cutting the glass ribbon into sheets while the ribbon still possesses residual heat from the molten material comprising:
   a. adjusting the temperature of the ribbon to about the strain point of the glass; and
   b. cutting the ribbon into sheets while at about the strain point.

2. The improvement according to claim 1 wherein the cutting includes the steps of:
   a. scoring the surface of the glass ribbon along a line at which each cut is to be made; and
   b. snapping the ribbon into sheets by distorting the portion of the ribbon on one side of the line relative to the portion on the other side.

3. The improvement according to claim 2 wherein:
   a. the temperature of the ribbon is maintained substantially uniform throughout its thickness and width at the time of cutting.

4. The improvement according to claim 2 wherein:
   a. the ribbon is maintained at a temperature between about 400°C to 550°C during cutting.

5. The improvement according to claim 4 wherein:
   a. the ribbon is maintained at a temperature of about 510°C during cutting.

6. The improvement according to claim 5 wherein:
   a. the snapping of the ribbon into sheets is effected by:
      1. holding the portion of the ribbon on one side of the score line in a first plane; and
      2. moving the portion of the ribbon on the other side of said line laterally out of said first plane.

7. The improvement according to claim 5 wherein:
   a. the snapping of the ribbon into sheets is effected by:
      1. holding the portion of the ribbon on one side of the score line in a first plane,
      2. moving the portion of the ribbon on the other side of said line into an unsupported position with said first plane, and
      3. applying a force against the unsupported portion of the ribbon at the leading end thereof to urge the unsupported portion out of said first plane and break it away from the supported portion at the score-line.

8. In the continuous production of glass sheets wherein a glass ribbon is formed from molten glass material, the improvement in cutting the glass ribbon into sheets while the ribbon still possesses residual heat from the molten material comprising:
   a. adjusting the temperature of the ribbon to about the strain point of the glass; and
   b. cutting the ribbon into sheets while at about the strain point by the steps of:
      1. scoring the surface of the glass ribbon along a line at which each cut is to be made; and
      2. applying a cold jet of fluid along said scoreline while the temperature of the glass is at about the strain point.

9. The improvement according to claim 8 wherein:
   a. the scoring is effected progressively in one direction across the glass ribbon; and
   b. the jet is applied progressively in said one direction to the scoreline in a trailing pattern.

10. In an apparatus for the production of glass sheets from a glass ribbon wherein the ribbon and sheets are fed along a predetermined path by a conveyor and cutting means are located along the conveyor for cutting the ribbon into successive sheets, the improvement wherein:
    a. a first conveyor section underlying the ribbon is disposed with its upper surface in a first plane for supporting said ribbon;
    b. a second conveyor section underlying the sheets is disposed with its upper surface in a second plane offset from the first plane in a direction away from said ribbon; and
    c. the cutting means includes:
       1. scoring means for scoring one surface of the ribbon along a line at which each cut is to be made, and
       2. means for initially urging the portion of the ribbon forward of the scoreline into said second plane after the entire portion has passed the first conveyor section.

11. The improvement of claim 10 wherein:
   a. said last mentioned means is a guide means disposed in the path of movement of the leading end of the ribbon at a point spaced forwardly of the first conveyor section by a distance equal to the length of said portion for urging the ribbon into said second plane.

12. The improvement according to claim 11 further including:
   a. holding means overlying said ribbon at the forward end of the first conveyor section for holding the ribbon in said first plane.

13. The improvement according to claim 12 further including:
   a. drive means for moving said second conveyor section at a greater speed than said first conveyor section.

14. The improvement according to claim 12 wherein:
   a. said conveyor sections are rollers having their axes of rotation parallel to each other and in a common plane with the diameter of the rollers of the second section being smaller than the diameter of the rollers of the first section; and
   b. the holding and guide means are rollers having their axes of rotation offset from said first plane in a direction opposite said second plane.

15. In an apparatus for the continuous production of glass sheets wherein a glass ribbon is formed from molten glass material, the ribbon and sheets are fed along a predetermined path by a conveyor and cutting means are located along the conveyor for cutting the ribbon into successive sheets, the improvement comprising:
   a. a first conveyor section underlying the ribbon and having its upper surface in a first plane;
   b. heating means for adjusting the temperature of the ribbon while on the first conveyor section to about the strain point of the glass;
   c. a second conveyor section underlying the sheets and having its upper surface in a second plane lower than said first plane;
   d. scoring means for scoring one surface of the ribbon along a line at which each cut is to be made as the ribbon is fed over said first conveyor section;
   e. holding means overlying said ribbon at the forward end of the first conveyor section for holding the ribbon against upward movement; and
   f. guide means disposed in the path of movement of the leading end of the ribbon at a point spaced forwardly of the first conveyor section by a distance equal to the length of the sheets to be cut for initially contacting and urging the portion of the ribbon forward of the scoreline into said second plane after the scoreline has passed the holding means.

16. In an apparatus for the production of glass sheets from a glass ribbon at a temperature about equal to the strain point wherein the ribbon and sheets cut from the ribbon are fed along a predetermined path by a conveyor and cutting means are located along the conveyor for cutting the ribbon into successive sheets at a location where the glass is at about the strain point, the improvement wherein the cutting means includes:
   a. scoring means mounted along the conveyor for scoring one surface of the ribbon along a line at which each cut is to be made; and
   b. nozzle means mounted along the conveyor for applying a localized cold jet of fluid along said scoreline.

* * * * *

UNITED STATES PATENT OFFICE
CERTIFICATE OF CORRECTION

Patent No. 3,754,884                Dated August 28, 1973

Inventor(s) James C. McDavid and Russell H. Miles

It is certified that error appears in the above-identified patent and that said Letters Patent are hereby corrected as shown below:

Column 1, line 1, "continuation" should read --continuing--;
         line 12, "of" should read --at--;
         line 18, "beomese" should read --becomes--;
         line 20, "shrink, Since" should read --shrink.  Since--;
         line 67, "disclosed" should read --discloses--.
Column 2, line 10, "realtive" should read --relative--;
         line 14, "is" should read --in--.
Column 5, line 14, "distoring" should read --distorting--;
    lines 37 and 38, "39 downstream" should read --39 is Signed and sealed this 26th day of March 1974.

(SEAL)
Attest:

EDWARD M. FLETCHER, JR.            C. MARSHALL DANN
Attesting Officer                  Commissioner of Patents